(12) United States Patent
Hirthammer et al.

(10) Patent No.: US 12,397,633 B2
(45) Date of Patent: Aug. 26, 2025

(54) TANK VENTILATION DEVICE FOR A MOTOR VEHICLE

(71) Applicant: Vitesco Technologies GmbH, Munich (DE)

(72) Inventors: Tobias Hirthammer, Langquaid (DE); Karl Gruenbeck, Kelheim (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/326,959

(22) Filed: May 31, 2023

(65) Prior Publication Data
US 2023/0302895 A1 Sep. 28, 2023

Related U.S. Application Data

(63) Continuation of application No. PCT/EP2021/076816, filed on Sep. 29, 2021.

(30) Foreign Application Priority Data

Dec. 4, 2020 (DE) ...................... 10 2020 215 376.0

(51) Int. Cl.
*B60K 15/035* (2006.01)

(52) U.S. Cl.
CPC ............... *B60K 15/03519* (2013.01); *B60K 2015/03566* (2013.01); *B60K 2015/03585* (2013.01)

(58) Field of Classification Search
CPC ........ B60K 15/03504; B60K 15/03519; F02M 25/08; F02M 25/0836; F02M 25/0872
See application file for complete search history.

(56) References Cited

U.S. PATENT DOCUMENTS

| | | | |
|---|---|---|---|
| 5,881,700 A | 3/1999 | Gras | |
| 6,006,799 A * | 12/1999 | Kraft | B60K 15/03519 141/307 |
| 6,247,458 B1 | 6/2001 | Heinemann | |
| 8,447,495 B2 * | 5/2013 | Pearce | B60K 15/03504 123/518 |
| 9,630,489 B2 * | 4/2017 | Shimokawa | B60K 15/03504 |
| 9,683,522 B2 * | 6/2017 | Shimokawa | F02M 25/0809 |
| 9,783,045 B2 * | 10/2017 | Aso | B60K 15/03177 |

(Continued)

FOREIGN PATENT DOCUMENTS

| DE | 19639116 A1 | 3/1998 |
|---|---|---|
| DE | 19829423 A1 | 1/2000 |

(Continued)

OTHER PUBLICATIONS

International Search Report and Written Opinion dated Jan. 5, 2022 from corresponding International Patent Application No. PCT/EP2021/076816.

(Continued)

*Primary Examiner* — Umashankar Venkatesan

(57) ABSTRACT

The disclosure relates to a tank ventilation apparatus for a motor vehicle which has a scavenging line which is arranged between an activated-carbon container and an intake line of the motor vehicle and in which an electrically driven scavenging pump is arranged. Furthermore, an electrically controllable directional control valve is provided in the scavenging line between the activated-carbon container and the electrically driven scavenging pump.

15 Claims, 2 Drawing Sheets

(56) References Cited

U.S. PATENT DOCUMENTS

| | | | |
|---|---|---|---|
| 9,909,539 B2* | 3/2018 | Fukui | B60K 15/03519 |
| 10,151,265 B2* | 12/2018 | Dudar | B60K 15/03519 |
| 10,871,114 B1* | 12/2020 | Oh | F02M 35/10222 |
| 11,040,866 B2* | 6/2021 | Collet | B67D 7/3227 |
| 11,400,806 B1* | 8/2022 | Dudar | B60K 15/03504 |
| 11,761,405 B2* | 9/2023 | Collet | F02D 41/003 |
| | | | 123/518 |
| 2004/0194831 A1* | 10/2004 | Balsdon | F02M 25/089 |
| | | | 123/520 |
| 2007/0137622 A1 | 6/2007 | Koyama | |
| 2012/0111307 A1* | 5/2012 | Hagen | F02M 25/08 |
| | | | 123/520 |
| 2016/0298578 A1 | 10/2016 | Makino | |
| 2019/0271284 A1 | 9/2019 | Sugiura | |
| 2020/0232430 A1* | 7/2020 | Inami | F02M 37/0082 |
| 2020/0309069 A1* | 10/2020 | Eser | F02D 41/0245 |
| 2022/0112855 A1* | 4/2022 | Kawase | B60K 15/03 |
| 2022/0185101 A1* | 6/2022 | Ko | B60K 15/03519 |

FOREIGN PATENT DOCUMENTS

| | | |
|---|---|---|
| DE | 19831188 A1 | 1/2000 |
| DE | 102016004381 A1 | 10/2016 |
| DE | 112017003175 T5 | 4/2019 |
| DE | 102017223277 A1 | 6/2019 |
| DE | 102019205483 B3 | 9/2020 |
| WO | 2012089432 A1 | 7/2012 |

OTHER PUBLICATIONS

German Office Action dated Aug. 3, 2022 for corresponding German Patent Application No. 10 2020 215 376.0.

\* cited by examiner

TANK VENTILATION DEVICE FOR A MOTOR VEHICLE

CROSS-REFERENCE TO RELATED APPLICATIONS

This application claims the benefit of PCT Application PCT/EP2021/076816, filed Sep. 29, 2021, which claims priority to German Application 10 2020 215 376.0, filed Dec. 4, 2020. The disclosures of the above applications are incorporated herein by reference.

TECHNICAL FIELD

The disclosure relates to a tank ventilation device of a motor vehicle.

BACKGROUND

In motor vehicles which are driven via an Otto engine, fuel gases are discharged from the fuel tank via a tank ventilation line, intermediately stored in an adsorption filter and then supplied to the Otto engine combustion. The metering of the discharged fuel gases is carried out in this instance via a tank ventilation valve which can take up the states completely opened and completely closed. Nevertheless, to be able to adjust the mass flow through this tank ventilation valve virtually continuously, the tank ventilation valve can be controlled by a PWM signal which is provided by the engine control of the motor vehicle. The frequency of a period of the PWM signal is constant. It is, for example, 10 Hz. This corresponds to a period duration of 100 ms. The tank ventilation valve is in the open state during an adjustable portion of this period duration and is in the closed state during the remaining time of this period.

It is further already known to provide a tank ventilation apparatus with an electrically driven scavenging pump in order also to be able to ensure a necessary scavenging mass during vehicle control strategies which are advantageous in terms of consumption, for example, when using a dethrottling or in the case of hybridisation.

In the case of timed control of the tank ventilation valve, there are produced disadvantages with regard to the acoustics and a non-uniform distribution of the tank ventilation gases over the individual cylinders of the motor vehicle. This can lead to decreases in comfort for the occupants of the motor vehicle, for example, noisy running of the engine, idle speed fluctuations, vibrations or engine noise. Furthermore, the pressure waves which are induced by the timed control of the tank ventilation valve make determining the gas composition using pressure measurements more difficult.

Furthermore, in the event of using an electrical scavenging pump, this scavenging pump is exposed to a high level of thermal loading because no cooling effect by convection is present during conveying counter to the closed tank ventilation valve. Completely switching off the pump is intended to be avoided in order to shorten response times. Furthermore, tank ventilation valves are subjected to production tolerances. This is evident as different opening timing ratios. Therefore, the respective opening point has to be established initially using an additional control device function.

SUMMARY

The disclosure provides a tank ventilation apparatus in which the above-mentioned disadvantages are reduced.

One aspect of the disclosure provides the tank ventilation apparatus which has a scavenging line arranged between an activated-carbon container and an intake line of the motor vehicle and in which an electrically driven scavenging pump is arranged. Furthermore, an electrically controllable directional control valve is provided in the scavenging line between the activated-carbon container and the electrically driven scavenging pump.

Such a tank ventilation apparatus allows the acoustic problems which occur in known tank ventilation apparatuses and the thermal loading of an electrically driven scavenging pump which is provided in the scavenging line to be reduced. Furthermore, such a tank ventilation apparatus allows, in comparison with known tank ventilation apparatuses, a more robust determination of the composition of the tank ventilation gases.

Implementations of the disclosure may include one or more of the following optional features. In some implementations, the electrically controllable directional control valve has a first input and a second input. The first input is connected to the activated-carbon container and the second input is connected to a fresh air filter.

In some examples, the second input of the electrically controllable directional control valve is connected to the fresh air filter via a shutoff valve.

In some examples, a pressure sensor is arranged in the scavenging line between the output of the electrically controllable directional control valve and the electrically driven scavenging pump.

In some implementations, a throttle location is arranged in the scavenging line between the electrically driven scavenging pump and the intake line.

A pressure sensor may be arranged in the scavenging line between the electrically driven scavenging pump and the intake line.

The pressure sensor may be arranged between the electrically driven scavenging pump and the throttle location.

In some examples, the tank ventilation apparatus has a control unit which is constructed to control the electrically driven scavenging pump and the electrically controllable directional control valve.

The control unit may be constructed to receive the output signals of the pressure sensors.

In some examples, the control unit is constructed to control the shutoff valve.

The electrically controllable directional control valve can be, in some examples, continuously adjusted.

In some implementations, the electrically controllable directional control valve is formed by two separate digitally switchable valves.

Another aspect of the disclosure provides a method for operating a tank ventilation apparatus, where tank ventilation gases which are stored in an activated-carbon container are conveyed via a scavenging line, in which an electrically controllable scavenging pump is located, into an intake line of a motor vehicle. The tank ventilation gases are directed via an electrically controllable directional control valve which is arranged in the scavenging line.

In some examples, the tank ventilation gases are directed via an electrically controllable directional control valve which is arranged in the scavenging line and mixed with fresh air in the directional control valve.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
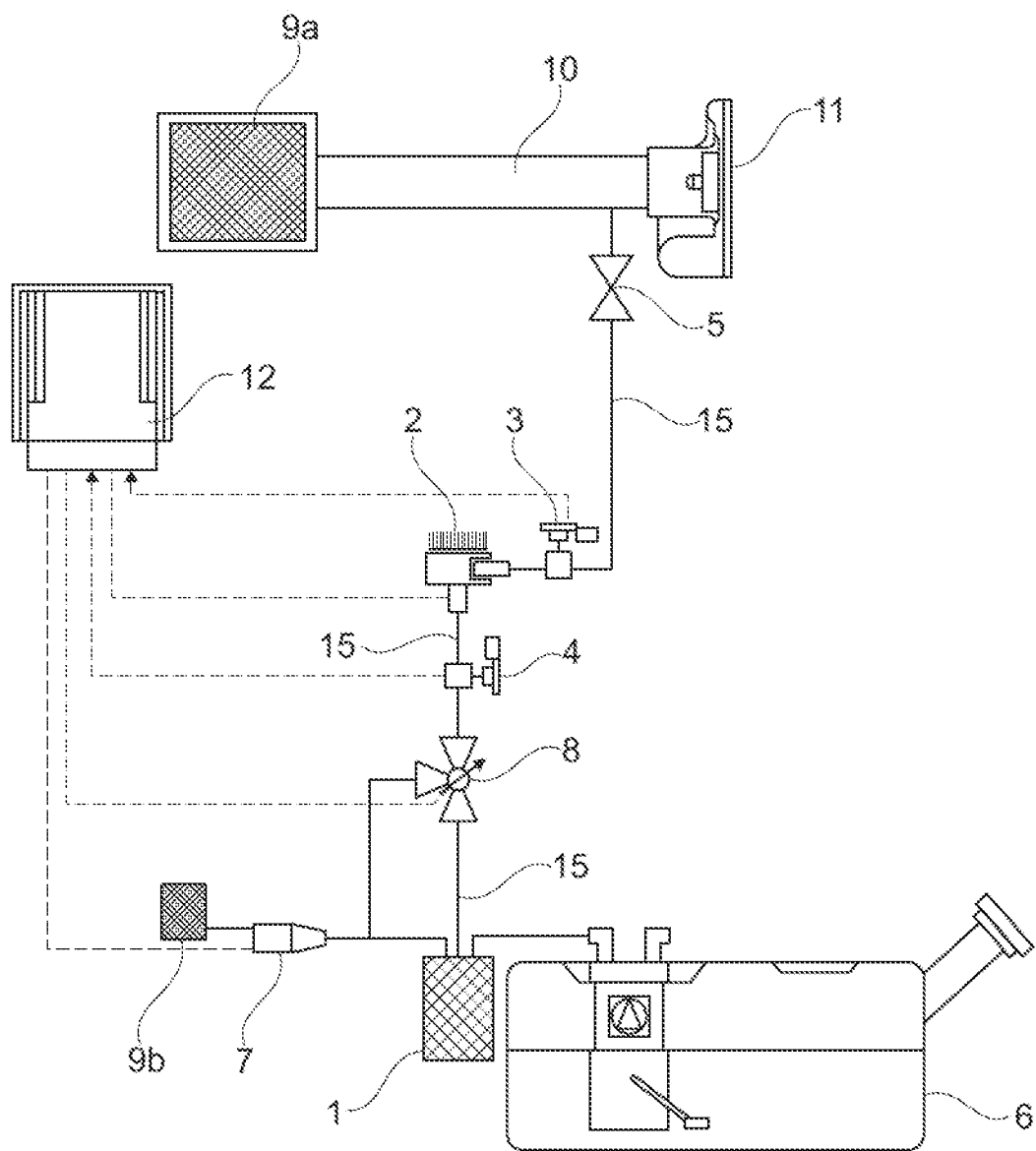
FIG. 1 shows a schematic drawing for explaining a first example of a tank ventilation apparatus.

FIG. 1 shows a schematic drawing for explaining a first example of a tank ventilation apparatus. The schematic drawing illustrated contains an activated-carbon container 1, an electrically driven scavenging pump 2, a first pressure sensor 3, a second pressure sensor 4, a throttle location 5, a fuel tank 6, a shutoff valve 7, an integrally constructed electrically controllable directional control valve 8, a first fresh air filter 9a, a second fresh air filter 9b, an intake line 10, a compressor 11, a control unit 12, and a scavenging line 15.

The scavenging line 15 extends from the activated-carbon container 1 as far as the intake line 10 of the motor vehicle. The electrically controllable directional control valve 8, the pressure sensor 4, the electrically driven scavenging pump 2, the pressure sensor 3 and the throttle location 5 are arranged in the scavenging line 15.

In this case, an input of the electrically controllable directional control valve 8 is connected to an output of the activated-carbon filter 1. A second input of the electrically controllable directional control valve 8 is connected via the shutoff valve 7 to the fresh air filter 9b. The output of the electrically controllable directional control valve 8 is connected to an input of the electrically driven scavenging pump 2 via the pressure sensor 4. The output of the scavenging pump 2 is connected to an input of the throttle location 5 via the pressure sensor 3. The output of the throttle location 5 is connected to the intake line 10 and opens in the intake line 10 in a region which is located between the fresh air filter 9a and the compressor 11.

The activated-carbon container 1 is provided to adsorb hydrocarbon gases which are discharged from the fuel tank 6. During operation of the motor vehicle, a regenerative scavenging of the activated-carbon container 1 is carried out, where hydrocarbon gases which are discharged from the activated-carbon container 1 are conveyed by the active scavenging pump 2 and are directed into the intake line via the throttle location 5. The pressure sensor 4 which is arranged upstream of the scavenging pump 1 in the scavenging line 15 is provided for measuring the fluid pressure between the activated-carbon container 1 and the scavenging pump 2. The pressure sensor 3 which is arranged downstream of the scavenging pump 2 is provided for measuring the fluid pressure in the scavenging line 15 between the scavenging pump 2 and the throttle location 5.

The compressor 11, arranged in the intake line 10, is a component of an exhaust gas turbocharger, to which a turbine which is not illustrated further belongs.

The output signals of the two pressure sensors 3 and 4 and additional sensor signals are supplied to the control unit 12, for example, sensor signals which are provided by a speed sensor, a crankshaft sensor, a camshaft sensor, an acceleration pedal sensor and one or more temperature sensors. The control unit 12 is constructed to evaluate the sensor signals which are supplied to it and which include the output signals of the pressure sensors 3 and 4, on the basis of a stored operating program and to provide control signals for the shutoff valve 7, the directional control valve 8 and the scavenging pump 2. Furthermore, the control unit 12 is constructed to control onboard diagnostic algorithms in order to carry out a legally prescribed onboard diagnosis.

Depending on the position of the directional control valve 8, in the scavenging phase of the activated-carbon container 1, either a flow can be directed from the fresh air filter 9b through the shutoff valve 7 and the directional control valve 8 via the scavenging pump 2 and the throttle location 5 into the intake line 10, or a flow can be directed from the activated-carbon filter 1 via the directional control valve 8, the scavenging pump 2 and the throttle location 5 into the intake line 10. Between these two extreme positions of the directional control valve 8, using intermediate positions of the directional control valve, a metering of the hydrocarbon gases into the intake line can be carried out. Such a regulation of the hydrocarbon quantity which is introduced into the intake line 10 is carried out primarily on the basis of a hydrocarbon concentration, which is established by the control unit 12, of the scavenging gas and not, as in known tank ventilation systems, by the total mass flow of the tank ventilation gas. This corresponds to a qualitative regulation instead of a quantitative regulation as carried out in known tank ventilation systems.

The control signals which are necessary for carrying out the control, necessary for the mentioned qualitative regulation, of the shutoff valve 7, the directional control valve 8 and the scavenging pump 2 are provided by the engine control unit 12, in the software of which the necessary functionality is implemented. This functionality includes, when the activated-carbon filter 1 is scavenged, inter alia a determination of the composition, the density and the required quantity of the scavenging gas using the output signals of the pressure sensors 3 and 4, an establishment of a necessary speed of the scavenging pump 2 and an establishment of the required position of the directional control valve 8.

The functionality mentioned further includes a production of the mentioned control signals in such a manner that a temperature protection of the scavenging pump is provided.

In this case, the density of the scavenging gas can be established from the measured pressure difference via the scavenging pump and the pump speed. In this case, the density is directly proportional to the measured pressure difference as a good approximation. The hydrocarbon concentration of the scavenging gas can be established from this gas density and the similarly measured ambient temperature and ambient pressure. In the knowledge of the gas composition, the throughflow through the throttle location 5 can be determined as follows:

Model for mass flow through the throttle location 5:

$$\dot{m}_5 = A_5 \cdot \Psi\left(\frac{P_{10}}{P_3}, K\right) \cdot \frac{P_3}{\sqrt{R_s \cdot T_3}}$$

Throughflow parameter:

$$\Psi = \begin{cases} \sqrt{\frac{2\kappa}{\kappa-1}} \cdot \sqrt{\left(\frac{P_{10}}{P_3}\right)^{\frac{2}{\kappa}} - \left(\frac{P_{10}}{P_3}\right)^{\frac{\kappa+1}{\kappa}}}, & \frac{P_{10}}{P_3} > p_{cr} \\ \sqrt{\frac{2\kappa}{\kappa+1}} \cdot \left(\frac{2}{\kappa+1}\right)^{\frac{1}{\kappa-1}}, & \frac{P_{10}}{P_3} \leq p_{cr} \end{cases}$$

where:

$\dot{m}_5$: Mass flow through the throttle 5 [kg/s]
$A_5$: Reduced cross sectional surface-area of throttle subjected to throughflow 5 [m²]
κ: Isentropic exponent of gas flow [-]
Ψ: Throughflow parameter [-]
$P_3$: Absolute pressure upstream of throttle 5 [Pa]
$P_{10}$: Absolute pressure downstream of throttle 5 [Pa]
$R_s$: Specific gas constant of gas flow [J/(kgK)]
$T_3$: Temperature upstream of throttle 5 [K]
$p_{cr}$: Critical pressure ratio [-], defined as $$p_{cr} = \left(\frac{2}{\kappa+1}\right)^{\frac{\kappa}{\kappa-1}}$$

With a known total mass flow through the throttle location and a desired hydrocarbon mass flow, which is predetermined by the engine operating point, into the intake line of the internal combustion engine, it is possible to determine the desired hydrocarbon concentration of the scavenging gas.

The hydrocarbon concentration of the scavenging gas is regulated via the position of the directional control valve. The engine control unit adjusts the necessary hydrocarbon concentration via a control circuit, for example, a PID controller. In this case, the described procedure is carried out iteratively.

At operating states, at which no scavenging of the activated-carbon filter is desired, the directional control valve is controlled so that the scavenging pump conveys clean air into the intake line of the combustion unit. As a result, thermally critical operating points, at which the scavenging pump conveys against a closed valve, can be prevented. Cooling of the pump by convection is carried out at each operating point at which the scavenging pump is operated.

The above-described qualitative regulation simplifies the tank ventilation system which has an electrically driven scavenging pump 2, reduces acoustic problems which occur in the case of known tank ventilation systems which have a cyclical valve and reduces thermal problems of the electrically driven scavenging pump 2. Furthermore, the tank ventilation system according to the disclosure allows a more robust determination of the composition of the tank ventilation gases as a result of smoother pressure gradients without induced pressure waves of the timing operation. Furthermore, the signal filtering can be carried out in a simplified manner or with less damping. This results in the determination of the composition of the tank ventilation gases being accelerated. Another advantage of the disclosure involves minimizing the centrifugal effect and the backflow effects because no conveying is carried out against a closed valve.

These advantages are based on a system configuration of the tank ventilation system, in which an electrically controllable directional control valve which is constructed to regulate the hydrocarbon concentration of the scavenging gas and an electrically controllable scavenging pump are arranged in the scavenging line which is provided between the activated-carbon filter and the intake line of the internal combustion engine. In this case, a desired hydrocarbon concentration is provided for the intake line of the internal combustion engine by a metering, which is dependent on the established hydrocarbon concentration of the scavenging gas, of the tank ventilation gases relative to filtered fresh air which is also supplied to the directional control valve.

Figure 2:
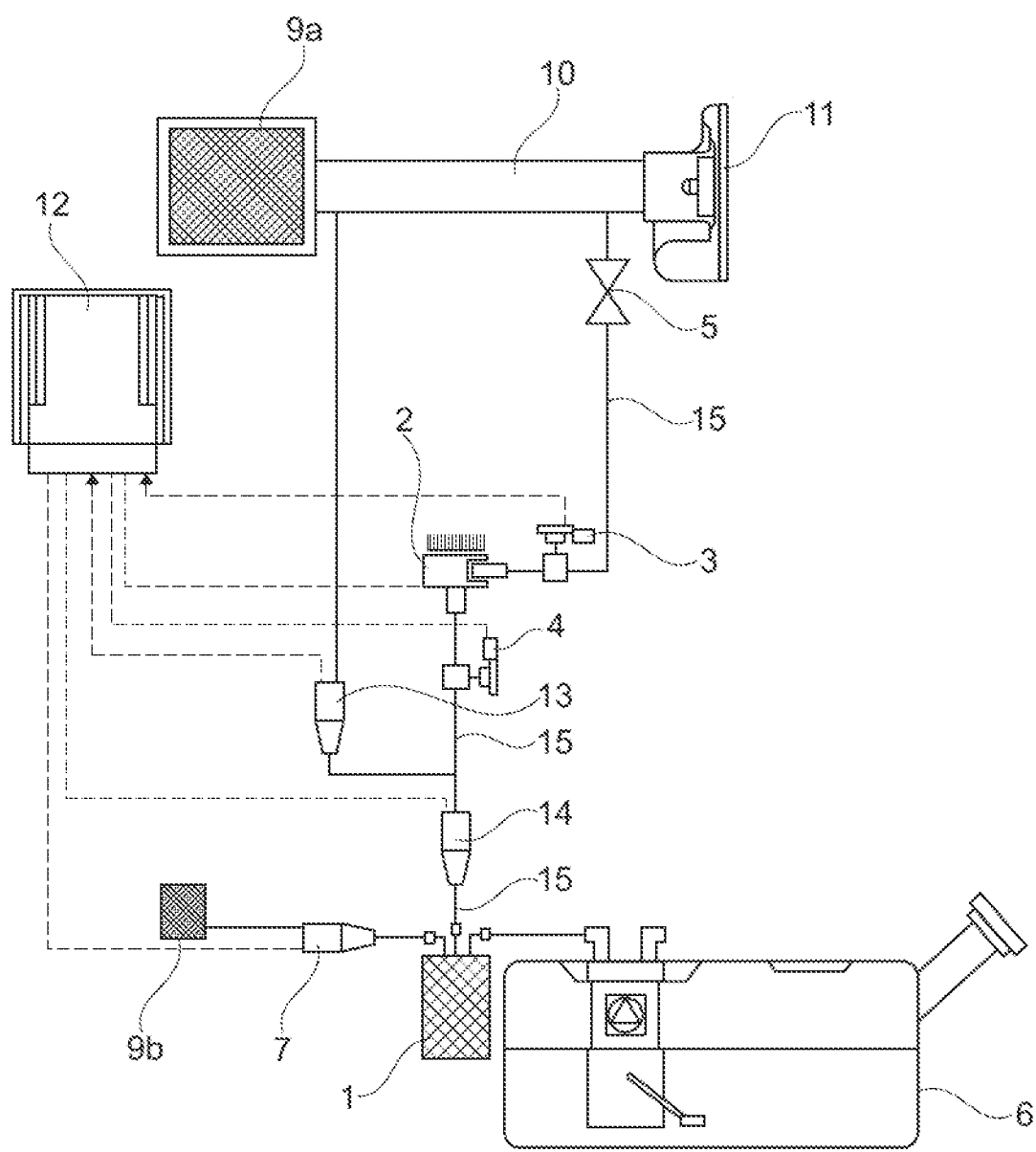
FIG. 2 shows a schematic drawing for explaining a second example of a tank ventilation apparatus.

FIG. 2 shows a schematic drawing for explaining a second example of a tank ventilation apparatus.

The apparatus illustrated in FIG. 2 differs from the apparatus illustrated in FIG. 1 in that the integral directional control valve 8 illustrated in FIG. 1 is replaced by two separate switchable valves 13, 14 which also form a digitally controllable directional control valve overall.

The valve 13 is acted on by the control unit 12 with control signals. One connection of the valve 13 is connected to the fresh air filter 9a. The other connection of the valve 13 is connected upstream of the pressure sensor 4 to the scavenging line 15.

The valve 14 is also acted on by the control unit 12 with control signals. One connection of the valve 14 is connected to the activated-carbon filter 1. The other connection of the valve 14 is also connected to the scavenging line 15 upstream of the pressure sensor 4. The control unit 12 controls the valves 13 and 14 in such a manner that a desired mixture of fresh air with the tank ventilation gas is directed into the intake line so that a desired hydrocarbon gas concentration reaches the intake line 10.

The additional components of the apparatus shown in FIG. 2 correspond to the components, which are accordingly numbered, of FIG. 1.

The above-described examples of the disclosure differ from the known tank ventilation apparatuses in that they do not have a cyclical valve. Advantages with regard to the vehicle acoustics, a uniform distribution of the scavenging gases over the cylinders of the motor vehicle, which has positive effects on the quiet running and the unprocessed emissions of the motor vehicle, and an increase of the scavenging throughput as a result of a powerful throttle location not being necessary, can thereby be afforded. Furthermore, the disclosure allows an increase in the precision and the robustness in establishing the scavenging gas composition and determining the throughflow through the throttle location 5. Furthermore, the thermal loading of the electrically controllable scavenging pump 2 which is arranged in the scavenging line 15 is reduced, whereby the service-life thereof is extended. Unlike known methods, the conveying of the tank ventilation gases into the intake line of the motor vehicle is regulated in accordance with the hydrocarbon concentration.

A number of implementations have been described. Nevertheless, it will be understood that various modifications may be made without departing from the spirit and scope of the disclosure. Accordingly, other implementations are within the scope of the following claims.

What is claimed is:
1. A tank ventilation apparatus for a motor vehicle, the tank ventilation apparatus comprising:
an activated-carbon container;
an intake line;
a scavenging line arranged between the activated-carbon container and the intake line;
an electrically driven scavenging pump is provided in the scavenging line; and
an electrically controllable directional control valve is provided in the scavenging line between the activated-carbon container and the electrically driven scavenging pump,
wherein the electrically controllable directional control valve is formed by a first valve having one connection to a fresh air filter and another connection to the scavenging line, and a second valve having one con- nection to the activated-carbon container and another connection to the scavenging line upstream of a pressure sensor.

2. The tank ventilation apparatus of claim 1, wherein the electrically controllable directional control valve has a first input and a second input, the first input is connected to the activated-carbon container and the second input is connected to a fresh air filter.

3. The tank ventilation apparatus of claim 2, wherein the second input of the electrically controllable directional control valve is connected to the fresh air filter via a shutoff valve.

4. The tank ventilation apparatus of claim 1, wherein the pressure sensor is arranged in the scavenging line between an output of the electrically controllable directional control valve and the electrically driven scavenging pump.

5. The tank ventilation apparatus of claim 1, further comprising a throttle location arranged in the scavenging line between the electrically driven scavenging pump and the intake line.

6. The tank ventilation apparatus of claim 5, wherein the pressure sensor is arranged in the scavenging line between the electrically driven scavenging pump and the intake line.

7. The tank ventilation apparatus as claimed in claim 6, wherein the pressure sensor is arranged between the electrically driven scavenging pump and the throttle location.

8. The tank ventilation apparatus of claim 6, further comprising a control unit controlling the electrically driven scavenging pump and the electrically controllable directional control valve.

9. The tank ventilation apparatus of claim 8, wherein the control unit receives output signal of the pressure sensor and output signals of one or more additional pressure sensors positioned along the scavenging line.

10. The tank ventilation apparatus of claim 8, wherein the control unit controls a shutoff valve.

11. The tank ventilation apparatus of claim 1, wherein the electrically controllable directional control valve is continuously adjusted.

12. A method for operating a tank ventilation apparatus, the method comprising:
conveying tank ventilation gases stored in an activated-carbon container via a scavenging line, in which an electrically controllable scavenging pump is located, into an intake line of a motor vehicle; and
directing the tank ventilation gases via an electrically controllable directional control valve which is arranged in the scavenging line, wherein the electrically controllable directional control valve is formed by a first valve having one connection to a fresh air filter and another connection to the scavenging line, and a second valve having one connection to the activated-carbon container and another connection to the scavenging line upstream of a pressure sensor.

13. The method of claim 12, wherein the tank ventilation gases mixed with fresh air in the electrically controllable directional control valve.

14. The method of claim 12, wherein the conveying of the tank ventilation gases into the intake line of the motor vehicle is regulated in accordance with a hydrocarbon concentration.

15. The method of claim 12, wherein the pressure sensor is arranged in the scavenging line between the electrically driven scavenging pump and the intake line.

* * * * *